(12) United States Patent
Kuske et al.

(10) Patent No.: US 9,297,296 B2
(45) Date of Patent: Mar. 29, 2016

(54) METHOD FOR DISCHARGING CONDENSATE FROM A TURBOCHARGER ARRANGEMENT

(71) Applicant: Ford Global Technologies, LLC, Dearborn, MI (US)

(72) Inventors: Andreas Kuske, Geulle (NL); Christian Winge Vigild, Aldenhoven (DE); Daniel Roettger, Eynatten (BE)

(73) Assignee: Ford Global Technologies, LLC, Dearborn, MI (US)

( * ) Notice: Subject to any disclaimer, the term of this patent is extended or adjusted under 35 U.S.C. 154(b) by 191 days.

(21) Appl. No.: 13/949,054

(22) Filed: Jul. 23, 2013

(65) Prior Publication Data

US 2014/0041381 A1 Feb. 13, 2014

(30) Foreign Application Priority Data

Aug. 7, 2012 (DE) .......................... 10 2012 213 996
Aug. 7, 2012 (DE) .......................... 10 2012 213 998

(51) Int. Cl.

| | | |
|---|---|---|
| *F02B 37/00* | (2006.01) | |
| *F02B 29/04* | (2006.01) | |
| *F28F 17/00* | (2006.01) | |
| *F28D 21/00* | (2006.01) | |

(52) U.S. Cl.
CPC ............ *F02B 37/00* (2013.01); *F02B 29/0468* (2013.01); *F28F 17/005* (2013.01); *F28D 2021/0082* (2013.01); *Y02T 10/146* (2013.01)

(58) Field of Classification Search
CPC .... F02B 37/00; F02B 29/0468; F28F 17/005; F28D 2021/0082; Y02T 10/146

USPC ................... 60/611, 599, 605.2; 123/568.12, 123/568.22; 62/285

See application file for complete search history.

(56) References Cited

U.S. PATENT DOCUMENTS

| | | | |
|---|---|---|---|
| 6,283,725 B1 * | 9/2001 | Goettel et al. ................. 417/292 |
| 6,301,887 B1 * | 10/2001 | Gorel et al. .................. 60/605.2 |
| 6,367,256 B1 * | 4/2002 | McKee ........................ 60/605.2 |
| 2007/0107425 A1 * | 5/2007 | Appleton ........................ 60/599 |
| 2008/0302327 A1 * | 12/2008 | Dahl et al. ............... 123/184.53 |
| 2009/0013977 A1 * | 1/2009 | Brecheisen, II ............... 123/563 |
| 2010/0077995 A1 * | 4/2010 | Buia et al. ..................... 123/542 |
| 2010/0229549 A1 * | 9/2010 | Taylor ............................. 60/599 |
| 2011/0099988 A1 | 5/2011 | Pellico |
| 2011/0107760 A1 * | 5/2011 | Quinn et al. .................... 60/599 |
| 2011/0253111 A1 * | 10/2011 | Pursifull ..................... 123/559.1 |
| 2012/0174576 A1 | 7/2012 | Vigild et al. |

(Continued)

FOREIGN PATENT DOCUMENTS

| | | | | |
|---|---|---|---|---|
| DE | 19714308 A1 * | 10/1998 | ............. | F02B 29/04 |
| DE | 102005008103 A1 | 8/2006 | | |

(Continued)

*Primary Examiner* — Jorge Pereiro
*Assistant Examiner* — Jason T Newton
(74) *Attorney, Agent, or Firm* — Julia Voutyras; Alleman Hall McCoy Russell & Tuttle LLP

(57) ABSTRACT

Methods and systems are provided for discharging condensate from a turbocharger arrangement of an internal combustion engine. Specifically, in on example, condensate may be drained from a condensate reservoir by opening a drain valve coupled to the condensate reservoir. Further, the drain valve may be closed responsive to engine operating conditions indicating the condensate reservoir has been completely drained.

19 Claims, 4 Drawing Sheets

(56) References Cited

U.S. PATENT DOCUMENTS

| | | | |
|---|---|---|---|
| 2013/0219886 A1* | 8/2013 | Koch et al. | 60/605.2 |
| 2014/0158096 A1* | 6/2014 | Leone et al. | 123/563 |

FOREIGN PATENT DOCUMENTS

| | | | | |
|---|---|---|---|---|
| DE | 102006053191 A1 | 5/2007 | | |
| DE | 102009004587 A1 | 7/2009 | | |
| DE | 102010038153 B3 | 3/2012 | | |
| FR | 2553827 A1 * | 4/1985 | | F02B 39/00 |
| FR | 2893677 A1 * | 5/2007 | | F02B 29/04 |
| FR | 2940366 A1 * | 6/2010 | | F02M 25/07 |
| FR | 2959779 A1 * | 11/2011 | | F02M 31/20 |
| JP | 2005226476 A * | 8/2005 | | F02B 29/04 |
| JP | 2009215915 A * | 9/2009 | | F02B 29/04 |
| JP | 2012007582 A * | 1/2012 | | F02M 21/02 |
| WO | 2007069972 A1 | 6/2007 | | |
| WO | 2012152301 A1 | 11/2012 | | |

* cited by examiner

METHOD FOR DISCHARGING CONDENSATE FROM A TURBOCHARGER ARRANGEMENT

CROSS REFERENCE TO RELATED APPLICATIONS

The present application claims priority to German Patent Application No. 102012213998.2, filed on Aug. 7, 2012, and German Patent Application No. 102012213996.6, filed on Aug. 7, 2012, the entire contents of each of which are hereby incorporated by reference for all purposes.

FIELD

The present invention relates to a method for discharging condensate from a turbocharger arrangement comprising an internal combustion engine that can be charged by means of at least one turbocharger and having a charged air cooler that is arranged in an intake tract between the turbocharger and the internal combustion engine.

BACKGROUND/SUMMARY

Charged air coolers are used in a manner known per se for the purpose of cooling the air that is compressed by the turbocharger and/or for cooling an air mixture of fresh air and exhaust gas that is being recycled. As the air and/or the air mixture cool down, it is possible for moisture, for example water, from the air and/or air mixture to condense in the intake tract of the internal combustion engine, in particular in the charged air cooler. The condensate must be removed from the intake tract in order to prevent the liquid condensate from passing from the intake tract into the internal combustion engine and damaging the internal combustion engine and/or damaging parts of the systems, for example as a result of corrosion.

A system for collecting and discharging condensate that forms in a charged air cooler of a chargeable internal combustion engine is, for example, known from US 2010/0229549 A1. The condensate is supplied to a reservoir by way of an outlet pipe that is connected to the charged air cooler on a bottom face. A reservoir outlet that can be closed by means of a valve is located on the bottom face of the reservoir. The level of condensate in the reservoir is determined by means of a fill level sensor. In order to prevent charged air from escaping from the charged air cooler by way of the outlet pipe into the reservoir and from escaping from said reservoir by way of the reservoir outlet as the condensate is discharged, the valve is only opened if the condensate fill level in the reservoir exceeds a predetermined minimum fill level. If there is at least the minimum level of condensate in the reservoir, a control unit that controls the valve opens the valve when particular operating conditions prevail in the internal combustion engine. In order to prevent the reservoir from overflowing, it is possible to provide a further fill level sensor that detects a maximum condensate fill level in the reservoir and the control unit causes condensate to be discharged from the reservoir as soon as the maximum condensate fill level is achieved. The system described renders it possible to discharge condensate from the reservoir without in so doing allowing charged air to escape from the charged air cooler, said system does, however, require at least one and/or two additional condensate fill level sensors for detecting the condensate fill level in the reservoir.

Furthermore, a condensate discharge device is known from WO 2007/069972 A1, wherein condensate can be discharged from a charged air cooler by means of said condensate discharge device. An orifice is provided for this purpose in a base of the charged air cooler, which orifice can be opened and closed by means of a closing element, wherein the closing element, for example a bimetal element, is controlled in dependence upon a temperature. The condensate discharge device described does not prevent charged air from escaping from the charged air cooler by way of the orifice that is opened in a predetermined temperature range.

On the basis of this background, the object of the present invention is to provide a method for discharging condensate from a turbocharger arrangement. In one example, the method may include opening a drain valve positioned within a condensate reservoir, the condensate reservoir fluidly coupled to an intake tract downstream of a charge air cooler (CAC) and then closing the drain valve in response to a pressure difference between the intake tract and ambient air decreasing below an initial pressure difference, the initial pressure difference determined before opening the drain valve, by a threshold amount. In another example, the drain valve may be closed in response to an air-fuel ratio decreasing below an initial air-fuel ratio, the initial air-fuel ratio determined before opening the drain valve, by a threshold amount. In yet another example, the drain valve may be closed in response to a mass air flow (MAF) in the intake tract upstream of the reservoir increasing above an initial mass air flow, the initial mass air flow determined before opening the drain valve, by a threshold amount. In some examples, the drain valve may be opened at pre-determined time intervals during engine operation. In other examples, the drain valve may only open during stead-state engine operating conditions wherein the pressure difference, air-fuel ratio, and or MAF may not be expected to change. In this way, the method allows for condensate that forms in the turbocharger arrangement to be discharged in a reliable manner while also reducing an amount of charged air escaping from the turbocharger arrangement as the condensate is discharged.

Moreover, the method is to be particularly simple to perform and in particular said method is not to require any additional components or is to require as few as possible additional components that are specifically required solely for performing the method. This object is achieved by virtue of a method having the features of claim 1. In addition, the subordinate claims disclose advantageous embodiments of the invention. It is to be noted that the features explained individually in the description hereinunder can be mutually combined in any technically expedient manner and disclose additional embodiments of the invention. The description additionally characterizes and specifies the invention in particular in conjunction with the figures.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
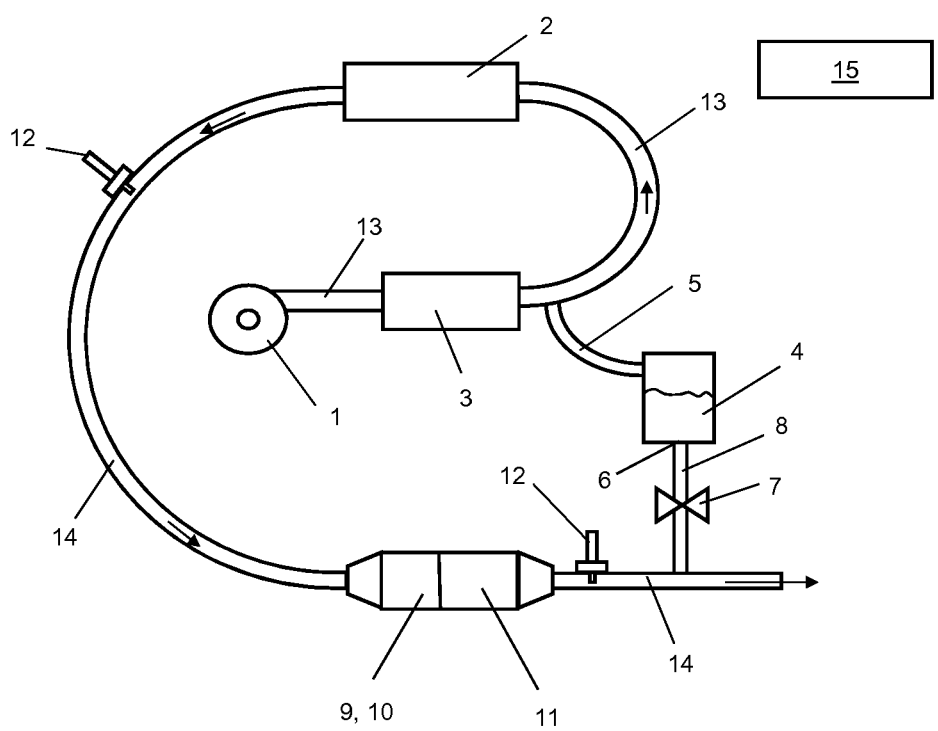
FIGS. 1-2 illustrate schematic views of a turbocharger arrangement for performing an exemplary embodiment of the method in accordance with the invention.
Figure 2:
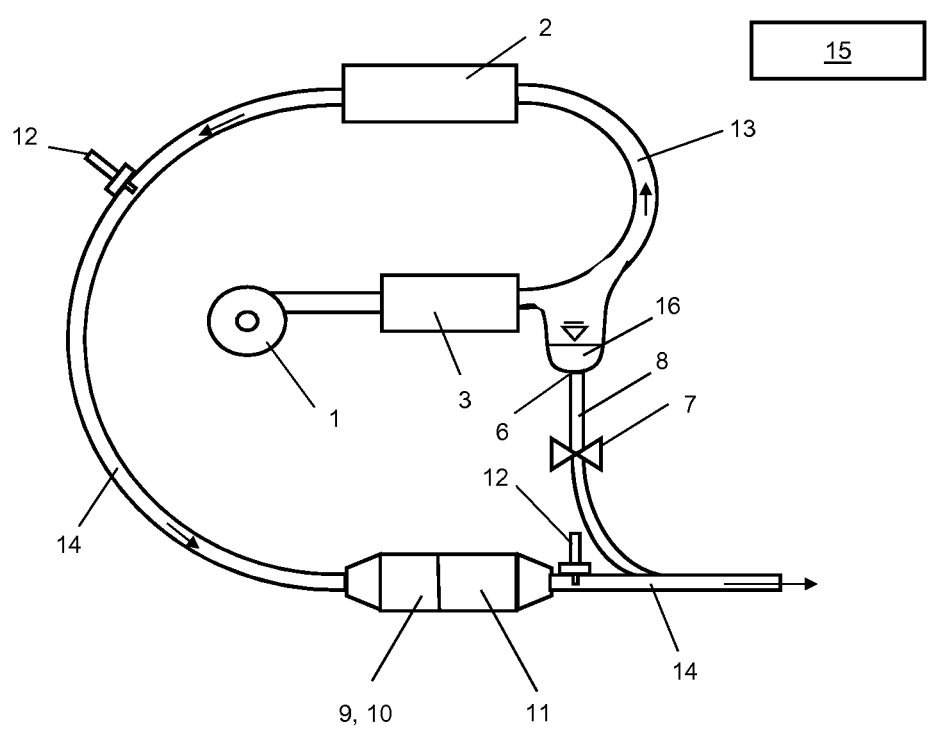
Figure 3:
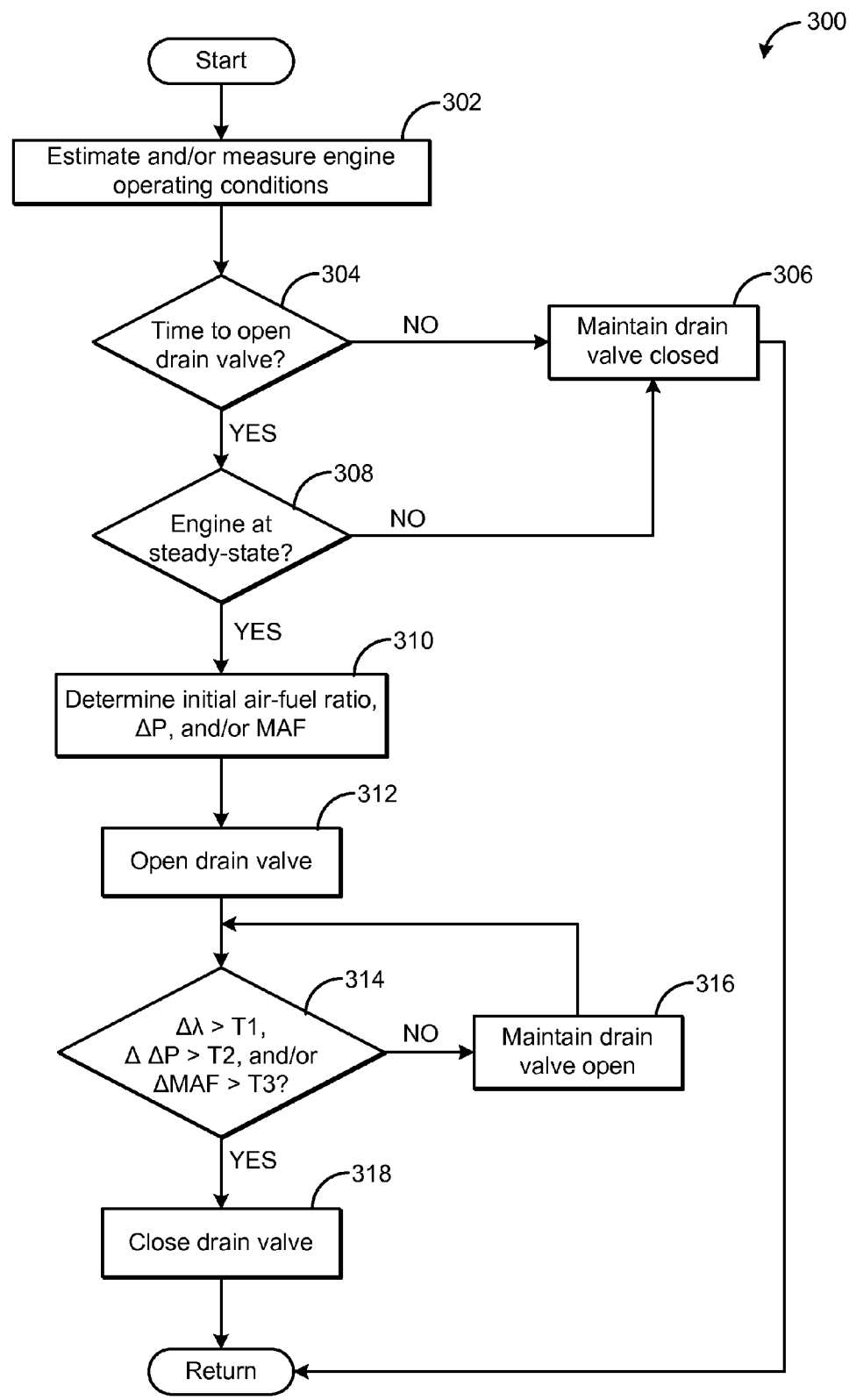
FIG. 3 shows a flow chart of a method for draining condensate from a reservoir responsive to engine operating conditions.
Figure 4:
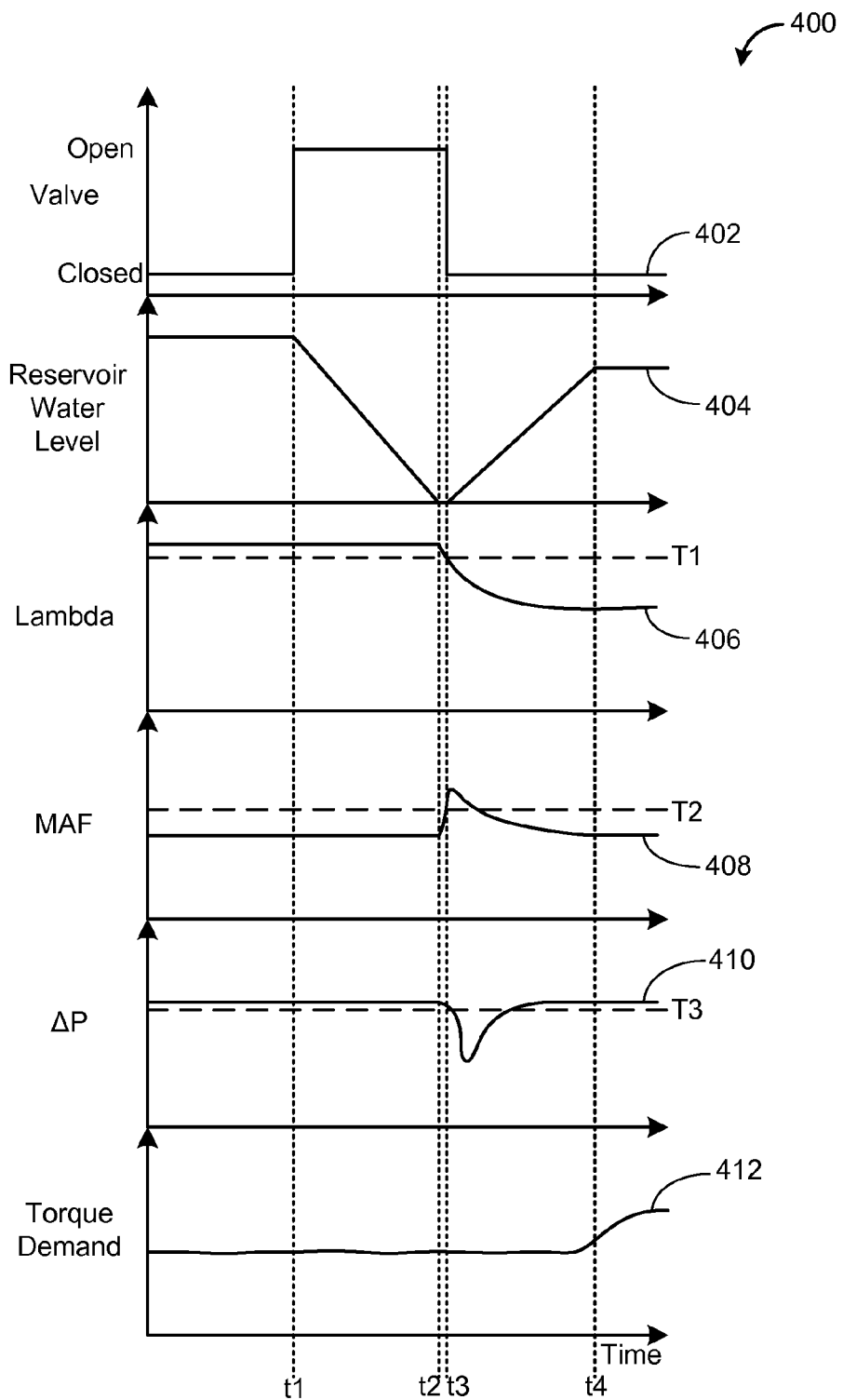
FIG. 4 illustrates a graphical example of valve operation for draining condensate from a reservoir responsive to engine operating conditions.

The following description relates to systems and methods for draining condensate from a condensate reservoir downstream of a charged air cooler (CAC). As shown in FIGS. 1-2, the CAC is positioned downstream of a turbocharger arrangement and upstream of an engine. FIG. 1 shows a first embodiment of a condense reservoir for collecting condensate expelled from the CAC and traveling along an intake tract to the engine. FIG. 2 shows a second embodiment of a condensate reservoir for collecting condensate, the condensate reservoir integrated into the intake tract. In both embodiments, a drain valve may be opened to drain condensate from the reservoir and into and exhaust tract. The valve may be opened periodically during engine operation. The valve may then be closed when the condensate is fully drained from the reservoir. FIG. 3 shows a method for controlling the valve to drain condensate from the reservoir. In one example, a change in lambda value (e.g., air-fuel ratio), measured from one or more lambda sensors in the engine system, greater than a first threshold may indicate the condensate is fully drained from the reservoir, thereby causing the valve to close. In another example, a change in a pressure difference between the intake tract and ambient air greater than a second threshold may indicate the condensate is fully drained from the reservoir, thereby causing the valve to close. In yet another example, a change in mass air flow (MAF) greater than a third threshold may indicate the condensate is fully drained from the reservoir, thereby causing the valve to close. In all three examples, the change in the respective values may be determined based on an initial value measured before the valve of the condensate reservoir was opened. In this way, condensate may be fully drained from the reservoir while decreasing an amount of charge air escaping the intake tract through the open valve. As a result, engine misfire events may be reduced while also maintaining a charged air volume to the engine. FIG. 4 shows example valve operation for draining condensate in response to engine operating conditions.

FIG. 1 illustrates a first embodiment of a schematic view of a turbocharger arrangement of a motor vehicle not illustrated in detail. The turbocharger arrangement comprises an internal combustion engine 2 that can be charged by means of a turbocharger 1, and a charged air cooler 3 (e.g., charge air cooler (CAC)) that is arranged in an intake tract 13 of the internal combustion engine 2 between the turbocharger 1 and the internal combustion engine 2. In the case of the exemplary turbocharger arrangement illustrated in FIG. 1, the internal combustion engine 2 is a diesel engine. An Otto engine can likewise be provided in place of the diesel engine.

The condensate that is formed from the moisture that is present in the intake air in the intake tract 13 and in particular in the CAC 3 during the operation of the turbocharger arrangement and/or the internal combustion engine is collected in a reservoir 4 (e.g., condensate reservoir) that, in the case of the turbocharger arrangement illustrated in FIG. 1, is arranged separately from the CAC 3 and is connected in a fluid-conducting manner to the intake tract of the internal combustion engine 2 by way of a connecting line 5 downstream of the CAC 3. Said another way, the reservoir 4 is fluidically coupled to the intake tract 13 via the connecting line 5 to allow condensate to drain from the intake tract 13 and into the reservoir 4. The reservoir 4 comprises a reservoir outlet 6 that can be closed by means of a valve 7 (e.g., drain valve). In the simplest embodiment, the valve 7 is a valve that comprises only an open and a closed operating position. In other example, the valve 7 may be a valve adjustable into a plurality of positions between fully open and fully closed. Additionally, the valve 7 may be referred to herein as the drain valve and the reservoir 4 may be referred to herein as the condensate reservoir. As is evident in FIG. 1, the reservoir outlet 6 is connected in a fluid-conducting manner to the exhaust gas tract 14 of the internal combustion engine 2 by way of a further connecting line 8, wherein the valve 7 is arranged in the case of this embodiment variant in the connecting line 8 and closes and respectively opens the reservoir outlet 6.

As is further evident in FIG. 1, a NOx-storage catalytic converter 9 (LNT: Lean NOx Trap) or a diesel catalytic converter 10 (DCC: Diesel Catalytic Converter) and a diesel particle filter 11 (DPF) are arranged in the exhaust gas tract 14 of the internal combustion engine 2 of the illustrated example in order to treat the exhaust gas. In FIG. 1, there are moreover two possible sites in the exhaust gas tract of the internal combustion engine 2 where it is possible to arrange at least one lambda sensor 12. The lambda sensor 12 may be arranged in the exhaust gas tract between the internal combustion engine 2 and the catalytic converter 9 and/or 10 and the diesel particle filter 11, said lambda sensor can likewise be arranged in the exhaust gas tract downstream of the catalytic converters 9 and/or 10 and the diesel particle filter 11. In each case, a lambda sensor 12 can likewise be arranged in the exhaust gas tract at both sites. As described further below, λ-values indicate the ratio of the air to the fuel (e.g., air-fuel ratio) in comparison to a stoichiometric mixture. The λ-values are determined with the aid of the lambda sensor 12. The lambda sensor 12 can, for example, be electrically connected to a control unit 15, not illustrated in FIG. 1, of an engine control unit (ECU) in order to evaluate the λ-values.

This control unit 15 or a further control unit (e.g., controller) that is connected to this control unit 15 is expediently electrically connected to the valve 7 in order to open said valve for the purpose of discharging condensate from the reservoir 4, wherein the valve 7 in accordance with the present invention is, however, open only for as long as the λ-values that are determined by means of the lambda sensor 12 while the valve 7 is in the open state remain unchanged in comparison to an initial λ-value, λ0, that was determined prior to the valve 7 being opened. The method in accordance with the invention ensures in this manner that essentially charged air cannot escape from the intake tract of the internal combustion engine 2 as condensate is being discharged from the reservoir 4. For example, the control unit 15 may include computer-readable instructions for opening and closing the valve 7.

In the case of the exemplary embodiment of the invention illustrated in FIG. 1, the valve 7 after being opened is, moreover, only then closed as soon as the λ-values that are determined by means of the lambda sensor 12 while the valve 7 is in the open state are lower in comparison to the initial λ-value λ0 that was determined prior to the valve 7 being opened. In other words, when the valve 7 is in the open state, the entire condensate that has collected in the reservoir is always discharged but at the same time charged air is effectively prevented from escaping by way of the reservoir 4.

Furthermore, during the operation of the turbocharger arrangement and/or of the internal combustion engine 2 the valve 7 after being closed is opened at a predetermined time interval again and repeatedly, i.e. periodically, for example by means of the control unit 15, and is closed when the λ-values are in the previously described condition. The condensate is periodically discharged from the reservoir 4 in this manner.

As is evident in FIG. 1, the condensate that is discharged from the reservoir 4 is delivered by way of the connecting line 8 into the exhaust gas tract of the internal combustion engine 2 downstream of both the catalytic converters 9 and/or 10 and the particle filter 11.

As introduced above, in the case of a method for discharging condensate from a turbocharger arrangement that comprises an internal combustion engine that can be charged by means of at least one turbocharger, in particular an Otto or diesel engine of a motor vehicle, and a charged air cooler 3 that is arranged in an intake tract 13 between the turbocharger 1 and the internal combustion engine 2, condensate that forms in the intake tract 13, in particular in the charged air cooler 3, is collected in accordance with the invention in a reservoir 4. The reservoir 4 comprises a reservoir outlet 6 that can be closed by means of a valve 7. Furthermore, λ-values (e.g., air-fuel ratios) are determined by means of at least one lambda sensor 12 that is arranged in an exhaust gas tract 14 of the internal combustion engine 2 and the valve 7 is open only as long as the λ-values remain essentially unchanged in comparison to an initial λ-value that was determined prior to the valve 7 being opened.

Within the meaning of the present invention, the reservoir 4 can be an integral component of the charged air cooler 3, it can, however, also be a reservoir that is arranged separately from the charged air cooler 3 (as shown in FIG. 1) and condensate that forms in the intake tract 13 of the internal combustion engine 2 is collected in said reservoir 4. In the latter case, the reservoir 4 is connected in a fluid-conducting manner by way of corresponding connecting lines (e.g., connecting line 5) to the intake tract 13 of the internal combustion engine 2 in order to convey the condensate from the intake tract 13 into the reservoir 4.

The intake tract 13 comprises within the meaning of the present invention only components of the internal combustion engine that convey combustion air, which components are located before, i.e. upstream, of the combustion chamber and/or the combustion space of the internal combustion engine. Similarly, the exhaust gas tract comprises only components of the internal combustion engine that convey exhaust gas, which components are located after, i.e. downstream, of the combustion chamber and/or the combustion space of the internal combustion engine.

The method in accordance with the invention ensures that the condensate that has collected in the reservoir 4 is reliably discharged, wherein the charged air is simultaneously effectively prevented from escaping from the exhaust tract 14 of the internal combustion engine by way of the reservoir outlet 6 while the valve 7 is in the open state. As lambda sensors are already provided in modern motor vehicles in the exhaust gas tract of the internal combustion engine for the purpose of performing a lambda control, the method in accordance with the invention does not require any additional components over and above, for example, additional condensate fill level sensors that are required solely for performing the method in accordance with the invention. The condensate fill level in the reservoir 4 and/or the state in which there is no condensate present in the reservoir 4 is generally determined by the λ-values that are determined by means of the lambda sensor, which λ-values indicate in a generally known manner the ratio of air to fuel in comparison to a stoichiometric mixture. In the case of the stoichiometric fuel ratio, it is precisely the quantity of air that is theoretically required to fully combust the fuel that is present. This is described as λ=1. If more fuel is present, this is described as a rich mixture (λ<1) and in the case of an excess of air a weak mixture is described as (λ>1).

Once the valve 7 has been opened in order to discharge the condensate from the reservoir 4, the λ-values that are determined while the valve 7 is in the open state are compared in accordance with the invention with a λ-value that was determined prior to the valve being opened (e.g., initial lambda value). As long as condensate is located in the reservoir 4, it is not possible for charged air to escape from the exhaust tract 14 of the internal combustion engine by way of the open reservoir outlet, as a consequence of which the λ-values do not essentially change. However, as soon as the condensate is fully discharged from the reservoir, charged air can escape from the reservoir 4 that is connected to the exhaust gas tract 14 in a fluid-conducting manner, following which the λ-values that are determined in the exhaust gas tract of the internal combustion engine reduce in value since the fuel mixture that is then supplied to the internal combustion engine is richer (λ<1) as a result of the charged air escaping from the exhaust gas tract. The valve is closed at the latest when this state is established and consequently the charged air is effectively prevented from escaping from the exhaust gas tract.

The valve 7 can naturally also be closed prior to the above described state being achieved. However, in order to be able to discharge all the condensate that is collected in the reservoir during a single opening procedure of the valve 7, an advantageous embodiment of the invention provides that the valve 7, after being opened, is only closed as soon as the λ-values are lower in comparison to the λ-value that was determined prior to the valve being opened and consequently said λ-values indicate that the condensate has been fully discharged from the reservoir.

In accordance with a further advantageous embodiment of the invention, the valve 7 is opened periodically at predetermined time intervals during the operation of the turbocharger arrangement and/or of the internal combustion engine. It is consequently ensured that during the operation of the internal combustion engine the condensate that forms in the exhaust gas tract is reliably discharged from the reservoir at regular time intervals. The time intervals can be fixedly predetermined in a particular simple manner for all operating modes of the turbocharger arrangement and/or of the internal combustion engine, however they can also be dynamically tailored to suit the respective operating mode. The time interval for repeatedly and periodically opening the valve is selected in each case in such a manner that in the case of a given condensate holding capacity of the reservoir the reservoir is prevented from overflowing.

A further advantageous embodiment of the invention provides that the condensate that is discharged from the reservoir is delivered into the exhaust gas tract downstream of a catalytic converter that is arranged in the exhaust gas tract and/or downstream of a diesel particle filter that is arranged in the exhaust gas tract. For this purpose, the reservoir outlet is connected by way of a fluid-conducting connecting line (e.g., connecting line 8) to the exhaust gas tract. In this case, the valve that closes the reservoir outlet can, for example, also be arranged in the connecting line that connects the reservoir outlet to the exhaust gas tract.

In accordance with a still further embodiment of the invention, the λ-values can be measured in the exhaust gas tract downstream of the internal combustion engine and upstream of a catalytic converter that is arranged in the exhaust gas tract and/or upstream of a diesel particle filter that is arranged in the exhaust gas tract. As an alternative or in addition thereto, the λ-values can likewise be measured in the exhaust gas tract downstream of a catalytic converter that is arranged in the exhaust gas tract and/or downstream of a diesel particle filter that is arranged in the exhaust gas tract.

FIG. 2 shows a second embodiment of a reservoir (e.g., condensate reservoir) coupled between an intake tract 13 and an exhaust tract 14. FIG. 2 may include like components to those described above with regard to FIG. 1. As described above with regard to FIG. 1, the condensate which forms in the intake tract 13 and in particular in the CAC 3, during operation of the turbocharger assembly or internal combustion engine 2, from the moisture present in the intake air, is collected in a reservoir 16 which in the turbocharger assembly shown in FIG. 2 is arranged separately from the CAC 3 on its outlet side in relation to the flow direction of the intake air, indicated by means of corresponding arrows in the diagram. The reservoir 16 has a reservoir outlet 6 which can be closed with a valve 7. As described above, in one example, the valve 7 is a valve with only one open and one closed position. As shown in FIG. 2, the reservoir outlet 6 is connected fluid-conductively via a connecting line 8 with an exhaust gas tract 14 of the internal combustion engine 2, wherein the valve 7 in this embodiment is arranged in the connecting line 8 and closes or opens the reservoir outlet 6.

During operation of the turbocharger assembly or internal combustion engine 2 and when the valve 7 is closed, in general there is a pressure difference ΔP between the air pressure in the intake tract 13 (charge air pressure), which for example can be detected by means of the charge air pressure sensor in the intake tract (not shown) provided in any case in the turbocharger assembly shown in FIG. 2, and an air pressure of the ambient air which in the embodiment example shown in FIG. 2 is detected in the exhaust gas tract 14 by means of a pressure sensor (not shown) downstream of the catalytic converters 9, 10 arranged in the exhaust gas tract 14 and the diesel particulate filter 11 arranged in the exhaust gas tract 14. To determine the pressure difference values ΔP between the charge air pressure and the ambient air pressure, the pressure sensors are each connected electrically with a control unit 15, for example an engine control unit (ECU). The control unit 15 is adapted, as well as for determining the pressure difference values ΔP, for determining the temporal change in pressure difference values ΔP.

As discussed above with regard to FIG. 1, the control unit 15 or a further control unit electrically connected with this control unit is suitably connected electrically with the valve 7 in order to be able to open and close this for the discharge of condensate from the reservoir 16. According to the present invention, here the valve 7 is opened at most as long as the temporal change in pressure difference values ΔP does not exceed a predefinable pressure threshold value. In this way the method according to the invention ensures that substantially no charge air can escape from the intake tract of the internal combustion engine 2 on discharge of condensate from the reservoir 16.

In the embodiment example of the invention shown in FIG. 2, after opening, the valve 7 is furthermore only closed again as soon as the temporal change in pressure difference values ΔP exceeds the predefinable pressure threshold value. This means that on an opening process of the valve 7, all condensate collected in the reservoir is discharged, but charge air is effectively prevented from being able to escape via the reservoir 16.

Furthermore, during operation of the turbocharger assembly or internal combustion engine 2, after closing, the valve 7 is opened again for example by the control unit repeatedly at a predefined time interval, i.e. periodically, and closed again under the condition described above of pressure difference values ΔP. The discharge of condensate from the reservoir 16 is thus performed periodically.

As shown in FIG. 2, the condensate discharged from the reservoir 16 is guided via the connecting line 8 into the exhaust gas tract 14 of the internal combustion engine 2 downstream of both the catalytic converters 9 and 10 and the particulate filter 11.

As described above, in a method for the discharge of condensate from the turbocharger assembly which comprises an internal combustion engine, in particular a petrol or diesel engine of a motor vehicle, which can be charged by means of at least one turbocharger, and a CAC (water- or air-cooled) arranged in an intake tract between the turbocharger and the internal combustion engine, condensate forming in the intake tract, in particular in the CAC, collects in a reservoir. The reservoir has a reservoir outlet which can be closed with a valve. Furthermore, pressure difference values between the air pressure in the intake tract and the ambient air, i.e. the air outside the turbocharger assembly, are determined by means of corresponding pressure sensors, as are also their temporal change. The valve is opened at most as long as the temporal change in pressure difference values does not exceed a predefinable pressure threshold value.

The method for draining condensate from the reservoir, as described further below at FIG. 3, guarantees a reliable discharge of condensate which has collected in the reservoir (e.g., reservoir 16 shown in FIG. 2), wherein simultaneously an escape of charge air from the intake tract of the internal combustion engine via the reservoir outlet during the opening state of the valve is effectively prevented. The condensate fill level in the reservoir, or the state in which no more condensate is present in the reservoir, is determined purely by the pressure difference values or their temporal change during the opening state of the valve. As long as the valve closes the reservoir outlet, there is a pressure difference between the air pressure in the intake tract (charge air pressure) and the air pressure of the ambient air. When condensate is present in the reservoir and the valve is opened, this pressure difference is substantially maintained on discharge of condensate from the reservoir, or changes only slightly because of the condensate volume discharged from the reservoir, as no charge air can escape from the intake tract of the internal combustion engine via the opened reservoir outlet. However, as soon as all condensate has been discharged from the reservoir, compressed charge air flows out of the intake tract from the reservoir via the opened valve. This leads to a sudden fall in charge air pressure in the intake tract. Therefore the predefinable pressure threshold value for the temporal change in pressure difference values is selected such that the temporal change in pressure difference values, on the sudden fall in charge air pressure in the intake tract because of the escape of charge air from the reservoir via the opened valve, exceeds the pressure threshold value and thus the state is reliably detected when no more condensate is present in the reservoir. At the latest at this time the valve is closed again to prevent a further escape of compressed charge air from the intake tract.

Advantageously, the charge air pressure values in the intake tract of the internal combustion engine can be detected by the charge air pressure sensor which is provided in the turbocharger assembly in any case, so that no additional pressure sensor need be provided to perform the method according to the invention and consequently the components of the turbocharger assembly already present can be utilized.

Evidently the valve can be closed again before reaching the state described above. However in order to be able to discharge all condensate collected in the reservoir in a single opening process of the valve, an advantageous embodiment of the invention provides that after opening, the valve is closed again only as soon as the temporal change in pressure difference values exceeds the predefinable pressure threshold value and thus indicates that the condensate has been fully discharged from the reservoir.

As the pressure difference values between the air pressure in the intake tract and the ambient air correlate directly with the mass air flow in the intake tract upstream of the reservoir, the method described above for discharging condensate from the turbocharger assembly can also be performed alternatively in that instead of the pressure difference values and their temporal change, the mass air flow (MAF) in the intake tract and its temporal change are detected, as will be explained further below.

According to the invention in the alternative method for the discharge of condensate from the turbocharger assembly which comprises an internal combustion engine, in particular a petrol or diesel engine of a motor vehicle, which can be charged by means of at least one turbocharger, and a CAC (water- or air-cooled) arranged in an intake tract, condensate forming in the intake tract, in particular in the CAC, collects in a reservoir. The reservoir has a reservoir outlet which can be closed by a valve. Furthermore, a mass air flow (MAF) in the intake tract upstream of the reservoir is determined for example by means of a corresponding mass air flow sensor, as is also its temporal change. The valve according to the invention is opened at most as long as the temporal change of the mass air flow does not exceed a predefinable mass air flow threshold value.

The alternative method according to the invention guarantees a reliable discharge of condensate collected in the reservoir, wherein simultaneously an escape of charge air from the intake tract of the internal combustion engine via the reservoir outlet during the opening state of the valve is effectively prevented. The condensate fill level in the reservoir, or the state in which no more condensate is present in the reservoir, is determined purely by the mass air flow or its temporal change during the opening state of the valve. As long as the valve closes the reservoir outlet, a specific mass air flow is determined in the intake tract upstream of the reservoir. When condensate is present in the reservoir and the valve is opened, this mass air flow is substantially maintained on discharge of condensate from the reservoir as no charge air from the intake tract of the internal combustion engine can escape via the opened reservoir outlet. However, as soon as all condensate has been discharged from the reservoir, compressed charge air flows out of the intake tract from the reservoir via the opened valve. This leads to a sudden increase in the mass air flow in the intake tract upstream of the reservoir. Therefore, the predefinable mass air flow threshold value for temporal change of the mass air flow is selected such that the temporal change of the mass air flow, in the case of escape of charge air from the reservoir via the opened valve, exceeds the established mass air flow threshold value and thus the state is reliably detected when no more condensate is present in the reservoir. At the latest at this time, the valve is closed again to prevent a further escape of compressed charge air from the intake tract.

Advantageously the mass air flow in the intake tract of the internal combustion engine can be detected by a mass air flow sensor already provided in any case in the turbocharger assembly so that no additional mass air flow sensor need be provided to perform the method according to the invention, and consequently the components of the turbocharger assembly already present can be utilized.

Evidently the valve can also be closed again before reaching the state described above. However, in order to be able to discharge all condensate collected in the reservoir in a single opening process of the valve, an advantageous embodiment of the invention provides that after opening, the valve is only closed again as soon as the temporal change of the mass air flow exceeds the predefined mass air flow threshold value and thus indicates that the condensate has been fully discharged from the reservoir.

According to a further advantageous embodiment of the invention, the valve is opened periodically at predefined time intervals during operation of the turbocharger assembly or the internal combustion engine. This guarantees that condensate forming in the intake tract during operation of the internal combustion engine is reliably discharged from the reservoir at regular intervals. In a particularly simple embodiment, the time intervals can be fixedly predefined for all operating states of the turbocharger assembly or internal combustion engine, however they can also be adapted dynamically to the respective operating state. In any case the time interval for the repeated periodic opening of the valve is selected such that for a given condensate capacity of the reservoir, an overflow of the reservoir is avoided.

A further advantageous embodiment of the invention provides that the condensate discharged from the reservoir is guided into an exhaust gas tract of the internal combustion engine downstream of a catalytic converter arranged in the exhaust gas tract and/or a diesel particulate filter arranged in the exhaust gas tract. For this the reservoir outlet is connected with the exhaust gas tract via a fluid-conductive connecting line. In this case the valve closing the reservoir outlet can for example also be arranged in the connecting line connecting the reservoir outlet with the exhaust gas tract. The exhaust gas tract in the sense of the present invention comprises all components of the internal combustion engine which carry exhaust gas and are located downstream of the combustion chamber of the internal combustion engine.

According to a further advantageous embodiment of the invention the air pressure in the intake tract of the internal combustion engine is measured downstream of the CAC and upstream of the internal combustion engine, or the mass air flow in the intake tract is measured upstream of the turbocharger.

The theoretical principles of the method described above are explained below. The mass flow of a medium flowing through a cross section area of the reservoir outlet is generally determined according to:

$$W = A \cdot \sqrt{2 \cdot \rho \cdot \Delta p} \cdot c_D$$

where:
W: mass flow
A: cross section area of reservoir outlet through which the mass of the medium moves per time unit
$\rho$: density of medium
$\Delta p$: pressure difference between the air pressure in the intake tract, upstream of the reservoir, and the ambient air
$c_D$: flow coefficient Thus, for the volume flow of condensate (water) flowing out from the reservoir outlet per time unit:

$$\frac{dV_{Kond}}{dt} = \frac{A \cdot \sqrt{2 \cdot \rho_{Kond} \cdot \Delta p} \cdot c_{D,Kond}}{\rho_{Kond}}$$

where:
$\rho_{Kond}$: density of condensate
$c_{D,Kond}$: flow coefficient of condensate and for the volume flow of air flowing out of the reservoir outlet per time unit:

$$\frac{dV_{Luft}}{dt} = \frac{A \cdot \sqrt{2 \cdot \rho_{Luft} \cdot \Delta p} \cdot c_{D,Luft}}{\rho_{Luft}}$$

where:
$\rho_{Luft}$: density of air
$c_{D,Luft}$: flow coefficient of air

On the assumption that the volume flow of condensate flowing out from the reservoir is equal to the volume flow of air flowing out from the reservoir, this means $$\frac{dV_{Kond}}{dt} = \frac{dV_{Luft}}{dt}$$

and $C_{D,Kond} = C_{D,Luft}$
it would then follow:

$$\frac{1}{\sqrt{\rho_{Kond}}} = \frac{1}{\sqrt{\rho_{Luft}}}.$$

In fact however for
$\rho_{Kond} = \rho_{Wasser} = 1000$ kg/m³ and
$\rho_{Luft} = 1.4$ kg/m³
the ratio between the roots of the densities of the condensate and air is:

$$\frac{\sqrt{\rho_{Kond}}}{\sqrt{\rho_{Luft}}} = 26.7$$

This means therefore that the assumption that the volume flow of condensate flowing out from the reservoir is equal to the volume flow of air flowing out from the reservoir is incorrect.

In the ratio shown above between the roots of the densities of condensate and air, the pressure drops or air mass flows behave accordingly on outflow of air or condensate in the intake tract, and thus serve as a basis for controlling the valve according to the present invention as has been described in detail above.

The engine systems in both FIG. 1 and FIG. 2 may include lambda sensor(s) 12. Further, the control unit 15 of FIGS. 1 and 2 may control the valve 7 in response to one or more of air-fuel ratio (e.g., lambda) measurements from the lambda sensor 12, mass air flow (MAF) measurements from a mass air flow sensor (not shown in FIGS. 1 and 2), and/or ΔP measurements determined from pressure sensors in the intake tract 13 and the exhaust tract 14. A method for adjusting the valve 7 (e.g., condensate valve) to control a flow of condensate from a condensate reservoir (such as reservoir 4 or reservoir 16) in response to one or more of the above engine operating conditions is described further below with regard to FIG. 3. The method described in FIG. 3 may be performed in an engine system including a reservoir, such as the reservoir 4 shown in FIG. 1 or the reservoir 16 shown in FIG. 2. In other embodiments, the reservoir may be a reservoir of a different shape or type positioned between the intake tract, downstream of the CAC, and the exhaust gas tract.

The systems of FIGS. 1-2 provide for an engine system including an intake manifold of an engine, a turbocharger, a charge air cooler positioned in an intake tract, upstream of the intake manifold, a condensate reservoir coupled to the intake tract, downstream of the charge air cooler, the condensate reservoir including a drain valve controlling flow of condensate from the reservoir and to an exhaust gas tract, downstream of a diesel particulate filter and a catalytic converter, and a control unit with a computer-readable instructions for opening the drain valve to drain condensate from the reservoir and then closing the drain valve responsive to a mass air flow in the intake tract upstream of the condensate reservoir increasing above an initial mass air flow, the initial mass air flow determined before opening the drain valve, by a threshold amount.

The instructions further include closing the drain valve responsive to an air-fuel ratio decreasing below an initial air-fuel ratio, the initial air-fuel ratio determined before opening the drain valve, by a threshold amount. The air-fuel ratio is determined by a lambda sensor positioned in the exhaust tract. Additionally, the instructions include closing the drain valve responsive to a pressure difference between the intake tract and ambient air decreasing below an initial pressure difference, the initial pressure difference determined before opening the drain valve, by a threshold amount. Further, the instructions further include maintaining the drain valve closed when the engine is not at steady-state.

Turning now to FIG. 3, a method 300 is shown for draining condensate from a condensate reservoir responsive to engine operating conditions. Specifically, a drain valve (such as valve 7 shown in FIGS. 1-2) may be opened to drain condensate from a condensate reservoir (such as condensate reservoir 4 or 16 shown in FIG. 1 and FIG. 2, respectively). Instructions for executing method 400 may be stored in a controller, such as the control unit 15 shown in FIGS. 1-2. Further, the controller may adjust the position of the drain valve (e.g., open and close the valve) in response to various engine operating conditions.

Method 300 begins at 302 by estimating and/or measuring engine operating conditions. Engine operating conditions may include engine speed and load, ambient air pressure, intake air pressure (e.g., charge air pressure in the intake tract), exhaust air pressure, drain valve position, MAF, air-fuel ratio (e.g., lambda value measured from one or more lambda sensors), ambient air temperature, charge air temperature at the inlet and outlet of the CAC, etc.

At 304, the method includes determining if it is time to open the drain valve. As described above, in one example, the controller may open the drain valve periodically at pre-determined time intervals during engine operation. The time intervals may be fixedly pre-determined for all operating modes of the turbocharger arrangement and/or of the internal combustion engine. However, in other examples, the time intervals may be dynamically tailored to suit the respective operating mode. For example, the time interval for repeatedly and periodically opening the drain valve may be selected in each case in such a manner that for a given condensate holding capacity of the reservoir, the reservoir is prevented from overflowing or filling to a threshold level. In yet another example, the controller may open the drain valve in response to engine operating conditions. For example, if ambient air temperature or temperatures of the CAC indicate increased condensate formation, the controller may open the drain valve.

If it is not time to open the drain valve at 304, the method continues on to 306 to maintain the drain valve closed. However, if it is time to open the drain valve, the method continues on to 308 to determine if the engine is at steady-state. Steady-state conditions may include conditions wherein torque demand is relatively constant. For example, mass air flow (MAF), charge air pressure, and air-fuel ratio (lambda) may not change during steady-state engine operation. If the engine is not at steady-state conditions, the method continues on to 306 to maintain the drain valve closed. Alternatively, if the engine is at steady-state conditions, the method continues on to 310 to determine an initial lambda (e.g., air-fuel ratio), initial ΔP (difference between charge air pressure in intake tract and ambient air pressure), and initial MAF. The controller then opens the drain valve at 312. As a result, condensate may drain from the condensate reservoir.

At 314, the method includes determining if a change in lambda, Δλ, from the initial lambda is greater than a first threshold, T1, a change in ΔP, Δ ΔP, from the initial ΔP is greater than a second threshold, T2, and/or a change in MAF, ΔMAF, from the initial MAF is greater than a third threshold, T3. If none of the conditions at 314 are met, the controller maintains the drain valve open at 316. However, if one or more of the conditions at 314 are met, the controller closes the drain valve at 318. For example, one or more of the conditions at 314 may indicate that the condensate reservoir is empty and charge air is escaping out of the intake tract through the open drain valve. Thus, the first threshold, second threshold, and third threshold may be determined such that these values represent charge air escaping from the intake tract through the reservoir via the open drain valve.

In some embodiments, only one of a change in lambda, a change in MAF, or a change in ΔP may be monitored by the controller and cause the drain valve to close at 318. Thus, the method at 314 may only include determining one of these values in relation to the corresponding initial value determined before the drain valve opened. In other embodiments, any combination of a change in lambda, a change in MAF, or a change in ΔP may be monitored by the controller and cause the drain valve to close at 318.

In this way, an engine method includes opening a drain valve positioned within a condensate reservoir, the condensate reservoir fluidly coupled to an intake tract downstream of a charge air cooler and closing the drain valve in response to an engine pressure decreasing below an initial engine pressure, the initial engine pressure determined before opening the drain valve, by a threshold amount. In one example, the engine pressure is an engine intake pressure measured in the intake tract, downstream of the condensate reservoir and upstream of the engine. More specifically, in some examples, the intake pressure is related to an ambient pressure such that the engine pressure is a pressure difference between the intake tract and ambient air. The threshold amount is based on a pressure drop indicating charge air escaping from the intake tract through the condensate reservoir and the open drain valve.

In one example, opening the drain valve includes opening the drain valve at pre-determined time intervals during engine operation. In another example, opening the drain valve includes opening the drain valve responsive to engine operating conditions and wherein the engine operating conditions include one or more of ambient air temperature and temperatures of the charge air cooler. Additionally, opening the drain valve may include opening the drain valve only during steady-state engine operating conditions, the steady-state engine operating conditions including a relatively constant torque demand.

The method may further include closing the drain valve in response to an air-fuel ratio decreasing below an initial air-fuel ratio, the initial air-fuel ratio determined before opening the drain valve, by a threshold amount. Additionally, the method may include closing the drain valve in response to a mass air flow in the intake tract upstream of the reservoir increasing above an initial mass air flow, the initial mass air flow determined before opening the drain valve, by a threshold amount.

FIG. 4 shows a graphical example of adjustments to a drain valve of a condensate reservoir, such as the valve 7 of one of the reservoir 4 or reservoir 16 shown in FIGS. 1-2, responsive to engine operating conditions. Specifically, graph 400 shows changes in a position of the drain valve at plot 402, changes in a condensate reservoir water (e.g., condensate) level at plot 404, changes in lambda (e.g., air-fuel ratio) at plot 406, changes in MAF at plot 408, changes in a difference between pressure in an intake tract, downstream of a CAC, and ambient air, ΔP, at plot 410, and changes in torque demand at plot 412. An engine controller, such as the control unit 15 shown in FIGS. 1-2 may close the drain valve in response to changes in MAF, ΔP, and or lambda during draining of condensate from the condensate reservoir. As described above, the controller may open the drain valve periodically during engine operation. Further, the reservoir water level may correspond to an amount or level of condensate within the condensate reservoir. As discussed above, the MAF may be determined in the intake tract, upstream of the condensate reservoir.

Prior to time t1, the reservoir water level is greater than zero (plot 404), thereby indicating that condensate is present in the reservoir. Also before time t1, the drain valve is closed (plot 402) and torque demand is relatively constant (plot 412). At time t1, the controller may open the drain valve in response to an indication that it is time to open the drain valve. For example, time t1 may correspond with a regular interval at which the drain valve is opened. Also, since the engine is at steady-state, as indicated by a relatively constant torque demand, the drain valve is opened at time t1.

After opening the drain valve at time t1, the reservoir water level begins to decrease as condensate drains from the reservoir and into the exhaust tract (plot 404). At time t2 the reservoir water level may be relatively zero, indicating that relatively all of the condensate has drained from the reservoir (plot 404). As soon as all the condensate has been discharged from the reservoir, compressed charge air may begin to flow out of the intake tract from the reservoir via the open drain valve. As can be seen between time t2 and time t3, the escape of charge air from the intake tract leads to a sudden fall in ΔP, sudden fall in lambda, or sudden increase in MAF.

As shown in FIG. 4, at time t3, lambda may decrease below an initial lambda value (e.g., the lambda value before time t2). Specifically, the controller may close the drain valve at time t3 in response to the lambda value decreasing below the initial lambda value by a first threshold amount (plot 406). The first threshold amount may be indicated by a first threshold line T1. Also at time t3, MAF may increase above an initial MAF (e.g., the MAF before time t2). Specifically, the controller may close the drain valve at time t3 in response to the MAF increasing above the initial MAF by a second threshold amount (plot 408). The second threshold amount may be indicated in graph 400 by a second threshold line T2. Further at time t3, ΔP may decrease below an initial ΔP value. Specifically, the controller may close the drain valve at time t3 in response to the ΔP value decreasing below the initial ΔP value by a third threshold amount (plot 410). The third threshold amount may be indicated by a third threshold line T3. As discussed above, the decrease in lambda values, the increase in MAF, and/or the decrease in ΔP between time t3 and time t4 may indicate that charged air is escaping from the intake tract by way of the condensate reservoir outlet and the drain valve. Thus, the controller closes the drain valve in order to reduce any further charged air from escaping from the reservoir outlet via the drain valve.

After time t3, the reservoir water level may increase (plot 404). After a set period of time, at time t4, the controller may indicate that it is time to open the drain valve and drain condensate from the condensate reservoir. However, at time t4, torque demand may be increasing (plot 412), thereby indicating that the engine is not at steady-state. As a result, the drain valve may remain closed even though the pre-determined time interval for opening the drain valve has been reached. The controller may wait until the engine is again at steady-state before opening the drain valve.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

In this way, an engine method includes opening a drain valve positioned in a reservoir outlet of a condensate reservoir, the condensate reservoir fluidly coupled to an intake tract downstream of a charge air cooler, and closing the drain valve in response to an air-fuel ratio decreasing below an initial air-fuel ratio, the initial air-fuel ratio determined before opening the drain valve, by a threshold amount. The threshold amount is based on a decrease in air-fuel ratio indicating charge air escaping from the intake tract through the condensate reservoir and the open drain valve. Additionally, the air-fuel ratio is measured with an air-fuel ratio sensor positioned in an exhaust gas tract downstream of an engine and upstream of one or more of a catalytic converter and a diesel particle filter. In one example, opening the drain valve includes opening the drain valve periodically at pre-determined time intervals during engine operation.

The method further includes opening the drain valve only during steady-state engine operating conditions, the steady-state engine operating conditions including a relatively constant torque demand. In one example, closing the drain valve is further responsive to an engine pressure decreasing below an initial engine pressure, the initial engine pressure determined before opening the drain valve, by a threshold amount. In one example, the engine pressure is a pressure difference between an intake tract pressure and ambient air pressure. In another example, closing the drain valve in further responsive to a mass air flow in the intake tract upstream of the reservoir increasing above an initial mass air flow, the initial mass air flow determined before opening the drain valve, by a threshold amount.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
   determining engine operating conditions including an initial engine pressure;
   determining whether it is time to open a drain valve based on the engine operating conditions, and if so, opening the drain valve, the drain valve arranged in a connecting line, the connecting line coupled to an outlet of a condensate reservoir, the condensate reservoir fluidly coupled to an intake tract downstream of a charge air cooler; and
   closing the drain valve in response to an engine pressure decreasing below the initial engine pressure by a threshold amount,
   wherein the opening the drain valve includes opening the drain valve at pre-determined time intervals during engine operation.

2. The engine method of claim 1, wherein the opening the drain valve includes opening the drain valve responsive to engine operating conditions and wherein the engine operating conditions include one or more of ambient air temperature and temperatures of the charge air cooler.

3. The engine method of claim 1, further comprising opening the drain valve only during steady-state engine operating conditions, the steady-state engine operating conditions including a constant torque demand.

4. The engine method of claim 1, wherein determining engine operating conditions further comprises determining an initial air-fuel ratio, the method further comprising closing the drain valve in response to an air-fuel ratio decreasing below the initial air-fuel ratio by a threshold amount.

5. The engine method of claim 1, wherein determining engine operating conditions further comprises determining an initial mass air flow, the method further comprising closing the drain valve in response to a mass air flow in the intake tract upstream of the condensate reservoir increasing above the initial mass air flow by a threshold amount.

6. The engine method of claim 1, wherein the engine pressure is an engine intake pressure and wherein the threshold amount is determined based on a pressure drop associated with charge air escaping from the intake tract through the condensate reservoir and the drain valve.

7. An engine system, comprising:
   an intake manifold of an engine;
   a turbocharger;
   a charge air cooler positioned in an intake tract, upstream of the intake manifold;
   a condensate reservoir coupled to the intake tract, downstream of the charge air cooler, an outlet of the condensate reservoir coupled to an exhaust gas tract via a connecting line, a drain valve arranged in the connecting line controlling a flow of condensate from the condensate reservoir to a portion of the exhaust gas tract which is downstream of a diesel particulate filter and a catalytic converter; and a control unit with computer-readable instructions for determining an initial mass air flow in the intake tract, and then opening the drain valve to drain condensate from the condensate reservoir, and then closing the drain valve responsive to a mass air flow in the intake tract upstream of the condensate reservoir increasing above the initial mass air flow by a threshold amount.

8. The engine system of claim 7, wherein the instructions further include instructions for determining an initial air-fuel ratio before opening the drain valve, and instructions for closing the drain valve responsive to an air-fuel ratio decreasing below the initial air-fuel ratio by a threshold amount.

9. The engine system of claim 8, wherein the air-fuel ratio is determined by a lambda sensor positioned in the exhaust tract.

10. The engine system of claim 7, wherein the instructions further include instructions for determining an initial pressure difference before opening the drain valve, and instructions for closing the drain valve responsive to a pressure difference between the intake tract and ambient air decreasing below the initial pressure difference by a threshold amount.

11. The engine system of claim 7, wherein the instructions further include instructions for determining whether the engine is at steady-state and instructions for maintaining the drain valve closed when the engine is not at steady-state.

12. An engine method, comprising:
determining engine operating conditions including an initial air-fuel ratio;
determining whether it is time to open a drain valve based on the engine operating conditions, and if so, opening the drain valve, the drain valve fluidly communicating with a reservoir outlet of a condensate reservoir, the condensate reservoir fluidly coupled to an intake tract downstream of a charge air cooler; and
closing the drain valve in response to an air-fuel ratio decreasing below the initial air-fuel ratio by a threshold amount.

13. The engine method of claim 12, wherein the opening the drain valve includes opening the drain valve periodically at pre-determined time intervals during engine operation.

14. The engine method of claim 12, wherein the air-fuel ratio is measured with an air-fuel ratio sensor positioned in an exhaust gas tract downstream of an engine and upstream of one or more of a catalytic converter and a diesel particulate filter.

15. The engine method of claim 12, further comprising determining whether steady-state engine operating conditions are present and opening the drain valve only during steady-state engine operating conditions, the steady-state engine operating conditions including a constant torque demand.

16. The engine method of claim 12, wherein determining engine operating conditions further comprises determining an initial engine pressure, the method further comprising closing the drain valve in response to an engine pressure decreasing below the initial engine pressure by a threshold amount.

17. The engine method of claim 16, wherein the engine pressure is a pressure difference between an intake tract pressure and ambient air pressure.

18. The engine method of claim 12, wherein determining engine operating conditions further comprises determining an initial mass air flow, the method further comprising closing the drain valve in response to a mass air flow in the intake tract upstream of the condensate reservoir increasing above the initial mass air flow by a threshold amount.

19. The engine method of claim 12, wherein the threshold amount is determined based on a decrease in air-fuel ratio associated with charge air escaping from the intake tract through the condensate reservoir and the open drain valve.

* * * * *